United States Patent [19]
Suermondt et al.

[11] Patent Number: 5,867,464
[45] Date of Patent: Feb. 2, 1999

[54] DEVICE FOR READING AN INFORMATION CARRIER, INCLUDING A DISCRIMINATOR FOR DETERMINING THE TYPE OF INFORMATION CARRIER

[75] Inventors: Rutgerus E.E.F. Suermondt, Eindhoven, Netherlands; Henry Cloetens, Grimbergen, Belgium

[73] Assignee: U.S. Philips Corporation, New York, N.Y.

[21] Appl. No.: 704,399

[22] Filed: Aug. 23, 1996

[30] Foreign Application Priority Data

Aug. 23, 1995 [EP] European Pat. Off. ............. 95202278

[51] Int. Cl.⁶ .................................................. G11B 3/90
[52] U.S. Cl. ................................. 369/58; 369/54
[58] Field of Search ........................... 369/54, 58, 44.26, 369/32, 47, 48, 33

[56] References Cited

U.S. PATENT DOCUMENTS

| | | | |
|---|---|---|---|
| 4,698,695 | 10/1987 | Kosaka et al. | 369/50 |
| 4,724,492 | 2/1988 | Kosaka et al. | 358/342 |
| 4,885,644 | 12/1989 | Ishii et al. | 369/58 |
| 5,177,728 | 1/1993 | Otsubo et al. | 369/58 |
| 5,202,874 | 4/1993 | Zucker et al. | 369/54 |
| 5,544,137 | 8/1996 | Ohara et al. | 369/54 |
| 5,633,840 | 5/1997 | Han | 369/58 |

FOREIGN PATENT DOCUMENTS

| | | |
|---|---|---|
| 1-143071A | 6/1989 | Japan . |
| 1-264660A | 10/1989 | Japan . |
| 8-036827 | 2/1996 | Japan . |

*Primary Examiner*—Tan Dinh
*Attorney, Agent, or Firm*—Michael E. Belk

[57] ABSTRACT

A device suitable for playing different types of information carriers, such as a CD and an MMCD, on which the information is recorded in a track pattern that has various physical parameters. The processing of the read signal for information reproduction, and the servo such as the drive motor and the servotracking, are to be set to the particular type of information carrier. For determining the type of information carrier, the device includes a discriminator. During a discrimination process, a read signal is generated without the servo tracking facility being in operation. Signal properties related to the physical parameters are then derived from the read signal, based upon which properties the type of information carrier is determined.

20 Claims, 2 Drawing Sheets

DEVICE FOR READING AN INFORMATION CARRIER, INCLUDING A DISCRIMINATOR FOR DETERMINING THE TYPE OF INFORMATION CARRIER

BACKGROUND OF THE INVENTION

This invention relates to a device for reading an information carrier on which an information pattern is recorded in the form of substantially parallel running tracks of readable effects or features, the device comprising a read head for generating a read signal by scanning the information carrier at a scanning position, servo tracking means for keeping the scanning position on the track, and discriminating means for determining the type of information carrier, the information pattern having at least one different physical parameter for each type of information carrier.

Such a device is disclosed in U.S. Pat. No. 4,724,492. This device is suitable for playing an audio Compact Disc (CD), a video Laser Disc with an FM-modulated audio signal (LD) and a video Laser Disc with a digital audio signal (LDD). During playback, the recorded information signal is recovered from the information pattern, while the signal processing and the settings of the servo means, among which drive motor control and servo tracking means, are to be adapted to the respective type of information carrier. For this purpose, the device includes discriminating means for determining a type of information carrier. The CD is distinguished on the basis of the diameter which is sensed by a sensor. The LD and LDD differ in recorded information pattern in the presence of the digital audio signal. To distinguish the LD from the LDD, the servo means are set, the disc is brought to speed and the read head is positioned over the track by the servo tracking means. Then, part of the information pattern is scanned during which operation the read signal is demodulated for recovering the information signal. A discrimination circuit finally detects the presence of the digital audio signal in that the frame sync occurs in the information signal.

A problem in the prior-art device is that for discriminating the types of information carriers in which only the information pattern is different, a complicated procedure is to be applied, which leads to the time-consuming determination of the type of information carrier.

SUMMARY OF THE INVENTION

It is an object of the invention to provide a device that comprises means by which different types of information carriers can be distinguished in a fast and simple manner.

For this purpose, the device according to the invention is characterized in that the discriminating means are adapted for determining a type of information carrier on the basis of read-signal properties related to the physical parameter while the servo tracking means are out of operation. This is advantageous, for example, in that no time is necessary for locking the servo tracking facility on a track. This is all the more an advantage if not all the possible types of information carriers can be optimally read with one servo means setting. For, in that case a number of attempts should be made in succession to scan a part of the information pattern with different servo settings, until the settings are found that correspond to the type of information carrier present. The invention is also based on the recognition that the read signal of a scanning position which is not kept on the track, does have properties related to physical parameters of the information pattern and that discrimination on the basis thereof renders the reproduction of the information contents of the information pattern unnecessary.

An embodiment of the device according to the invention is characterized in that the discriminating means are adapted for determining the properties of the frequency spectrum of the read signal when the scanning position is moved in a direction substantially parallel with the tracks. In the event of such a movement in the longitudinal direction of the tracks, the scanning position will alternately see parts of parallel tracks or fall between the tracks and then partly cover two adjacent tracks. The read signal is then unfit for demodulation and for the reproduction of the information signal, it is true, but the frequency spectrum of the read signal will, in essence, be determined by the physical parameters of the effects in the longitudinal direction. This is advantageous in that the type of information carrier can be simply derived from the frequency spectrum at a specific longitudinal speed.

A further embodiment of the device according to the invention is characterized in that the discriminating means are adapted for determining a type of information carrier, while for each type of information carrier only effects of a limited number of lengths occur and the lengths differ by a fixed step size, and for detecting in the read signal one or more frequency components related to the lengths or the step size. This is advantageous in that the related frequency components are dominantly present in the read signal and may be detected in a simple manner. This is all the more advantageous since the detection is usually possible by means already present for the reproduction of the information signal.

A further embodiment of the device according to the invention in which the information carrier is disc-shaped is characterized in that the movement comprises making the information carrier rotate with a predetermined speed of rotation and positioning the scanning position at a predetermined radial distance from the point of rotation. This is advantageous in that, as a result, a predetermined longitudinal speed is realized and such a movement can be realized in a simple manner by the servo means already present.

A further embodiment of the device according to the invention is characterized in that the discriminating means are adapted for determining the minimum and maximum level of the read signal. This is advantageous, for example, in that the read signal modulation depth, which may differ per type of information carrier, can be simply determined from the various effects.

A further embodiment of the device according to the invention is characterized in that the discriminating means are adapted for detecting the number of crossings of the scanning position with a track when the scanning position is moved in the direction transverse to the direction of the tracks. This is advantageous in that, with a transverse movement over a known distance, the track pitch which denotes the mutual distance between the tracks and which may be different for each type of information carrier, can be determined in a simple manner.

BRIEF DESCRIPTION OF THE DRAWINGS

These and other aspects of the invention will be apparent from and elucidated with reference to the embodiments described hereinafter, in conjunction with the following drawings, in which.

DESCRIPTION OF THE PREFERRED EMBODIMENTS

Figure 1:
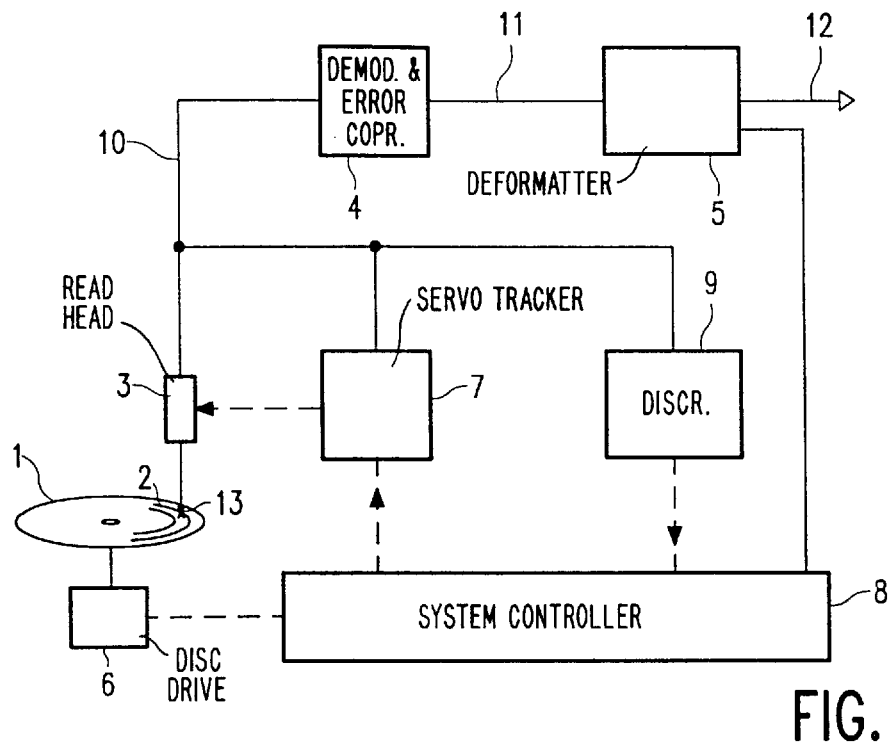
FIG. 1 shows a device for reading an information carrier.

FIG. 1 shows a device according to the invention for reading an information carrier 1, comprising discriminating means 9 for determining a type of information carrier. The information carrier is of an optically readable disc-shaped type such as, for example, the audio CD or a high-density CD such as a Multi Media CD (MMCD). However, the invention may likewise be applied in combination with information carriers of a magnetic type, or tape-like information carriers. An extensive description of reading a CD is to be found in the title 'Principles of optical disc systems' by Bouwhuis et al., ISBN 0-85274-785-3. The MMCD distinguishes itself from the CD, for example, by a larger information density, while the information pattern is formed by smaller effects and the intertrack distance, track pitch, is smaller than with the CD. The device comprises a read head 3 for scanning the track 2 by an optical beam at a scanning position 13 to read the information carrier 1. The read signal 10 goes to the demodulation and error correction means 4. The information signal 11 thus recovered comprises not only recorded information, but also all the medium-dependent information such as addresses, control and synchronization information. From there the information signal 11 goes to a deformatter 5 where the medium-dependent information is extracted and applied to the system controller 8. The recovered user information is produced via output 12, for example, in the form of a digital bit stream. In another embodiment the device may further include a decoder (not shown) for decoding the digital user information to an analog signal, such as, for example, an MPEG-2 coded digital video signal to an analog video signal, or a converter for converting a digital audio signal into an analog audio signal. The information carrier 1 is brought to the desired speed of rotation by drive means 6. The read head 3 is positioned over the scanning position of information carrier 1 by a positioning unit, for example, a slide or swivelling arm (not shown) which is driven by the system controller 8. The servo tracking means 7 derive from the read signal 10 servo information which is indicative of the location of the scanning position 13 relative to the centre of the track 2. With the servo tracking means the scanning position 13 is adapted for keeping the scanning position 13 on the track 2.

For an optimum reading of these types of information carriers, it may be desirable for the servo settings and the signal processing to be adapted to the type of information carrier. For an adequate adaptation, the type of information carrier needs to be known. For determining the type of information carrier, the device according to the invention comprises discriminating means 9 which are coupled to the system controller 8 for passing on a discrimination signal that indicates the type of information carrier. The discriminating means 9 are coupled to the read signal 10 and detect its signal properties which are related to one or more physical parameters of the information pattern. The read signal is to this end analyzed in a discrimination procedure after an information carrier has been inserted. For different types of information carriers a single discrimination procedure is used in which a read signal is generated while the servo tracking means 7 are out of operation and the scanning position 13 is not kept on a specific track either. A number of the further servo-control means, more specifically, the focusing controller, are set in a predetermined manner, so that the read signal has signal properties related to physical parameters. Several examples of physical parameters and related signal properties are described with reference to FIGS. 2 and 3.

In other embodiments the device is suitable for playing different types of information carriers, such as a magnetic disc or an optical or magnetic tape where an information pattern of substantially parallel tracks is available on the information carriers. Such a device naturally has drive means, positioning means and servo tracking means suitable for the respective type of information carrier. Distinguishing between types of information carriers is effected in comparable manner based upon signal properties of the read signal while servo tracking means are out of operation.

Figure 2:
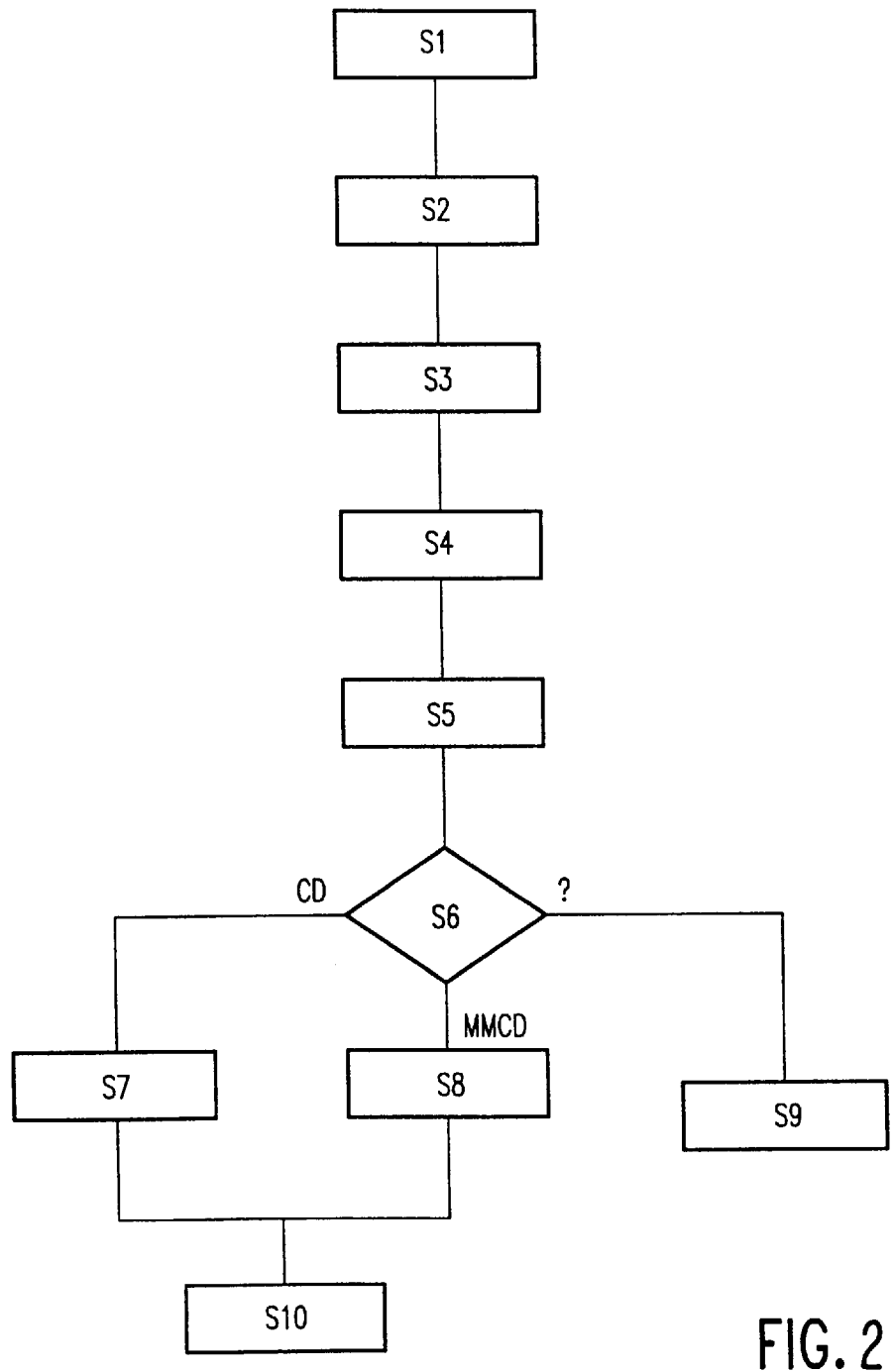
FIG. 2 shows a diagram of a discrimination procedure.

FIG. 2 gives a diagrammatic representation of a discrimination procedure according to the invention as an example for discrimination between the CD and the MMCD. The procedure is executed by the system controller 8 and the discriminating means 9. In step S1 the device is turned on and an information carrier is inserted into the device. In step S2 all the settings of the device that depend on the type of information carrier are brought to a given value. For this purpose, a suitable value is selected from the range of values customary for types of information carriers, for example, an average or the lowest value for the speed of rotation of the information carrier. In step S3 the drive means are driven for making the information carrier rotate at a fixed predetermined speed of rotation. In step S4 the read head is positioned at a predetermined radial distance from the point of rotation. If the positioning means have a sensor that indicates the radial distance, a random selection of the distance is possible. In a device without such a sensor, a known fixed stop point of the positioning means such as a stop point at the minimum radial distance may be used, for example. Then a small fixed distance to the exterior may be covered, so that the scanning position 13 certainly lies on the information pattern at a known radial distance with a limited tolerance. This may be realized, for example, by applying a small fixed control voltage to the positioning servo. The steps S3 and S4 will cause the information pattern to move along the scanning position at a known longitudinal speed in the direction substantially parallel with the tracks. In step S5 the laser in the read head and the focusing servo are activated. As a result, the read signal 10 is generated. The servo tracking means 7 are not switched on. The type of information carrier is still unknown and an optimum servo tracking generally requires an adaptation of the setting of the servo tracking means 7 to the type of information carrier. In addition, the locking of the servo tracking control requires additional time. In step S6 the signal properties of the read signal 10 are determined, which are related to one or more physical parameters of the information pattern which are characteristic of the types of information carriers to be discriminated. For this purpose, signals indicative of one or more of the properties, for example, the amplitude variation or the frequency contents of the read signal 10, are derived by deriving means which are known to a person skilled in the art. Based on the derived signals, the type of information carrier is then determined and transferred to the system controller 8. Depending on the detected type of information carrier, step S7, S8 or S9 is then proceeded to. In the case of a CD, step S7 is proceeded to, in which the settings of the device are adapted to a CD. In the case of an MMCD, step S8 is proceeded to in which the settings of the device are adapted to an MMCD. Step S9 is proceeded to if the type of information carrier cannot be played and the information carrier is, for example, ejected automatically. After step S7 or step S8 follows step S10 in which the information carrier is played, while naturally the servo tracking means 7 are operative.

In an embodiment of the discrimination procedure, properties of the frequency spectrum, such as comparing the amount of energy in a low-frequency band and in a high-frequency band, which may be obtained by simple filter means, are determined in step S6 while the signal properties are being determined. These energy contents may be different for different types of information carriers which have different densities and different effect dimensions. With a suitable choice of the filter frequencies, the type of information carrier can be determined in a simple manner.

In another embodiment of the discrimination procedure, the scanning position is moved over a predetermined distance in a direction transverse to the tracks in step S6 while the signal properties are being determined. As a result, signal components are formed in known manner in the read signal, which components correlate with the crossing of a track. These signal components are counted and so are the number of crossings. The number of crossings over a known distance or the number of crossings per unit of time at a known transverse speed is then related to the track density and thus to the track pitch. This track pitch is one of the physical parameters which are clearly different for the CD (about 1.6 µm) and the MMCD (about 0.8 µm). It is not necessary in this case to effect in step S3 a precise speed of rotation and a precise radial position in step S4. In the case of too low a speed of rotation, however, there is a risk of a crossing not being detected, because too few detectable effects are present there.

Figure 3:
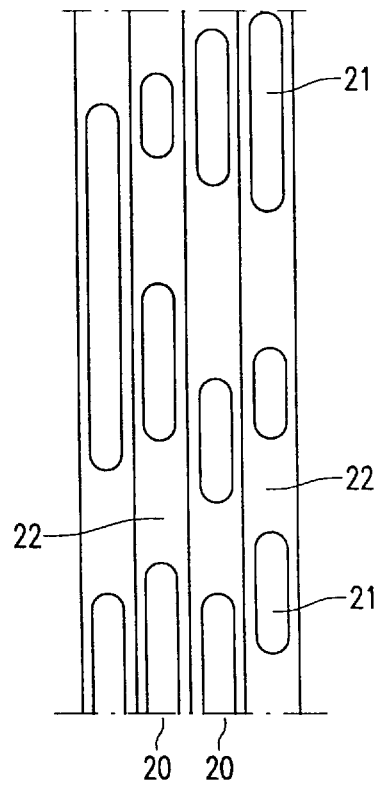
FIG. 3 shows a part of an information pattern.

FIG. 3 gives a diagrammatic representation of a part of an information pattern in which four parallel tracks 20 are indicated. The tracks are formed by effects 21 and 22 which can be read out, for example, optically or magnetically. The effects represent a binary signal for which the lands or pits 21 show one polarity and the spacings 22 the other polarity. The effects (thus both the lands 21 and the spacings 22) have only a limited number of lengths and the lengths constantly differ by a fixed step size T. For the CD, for example, the lengths 3T to 11T occur. This causes in the read signal a strong frequency component related to T to occur, which is also referenced the bit clock. For the recovery of the digital information, the bit clock is to be regenerated. For this purpose, the demodulation means 4 comprise means for regenerating the bit clock, for example, a so-called Phase-Locked Loop (PLL). A PLL may be realized in a known, analog or digital, manner. It is possible to utilize the PLL already present for the detection of the frequency of the bit clock. For this purpose, the PLL is to be arranged for determining the frequency at which the PLL is locked. This information is transferred to the discriminating means 9. The discriminating means 9 then establish whether the detected frequency lies in one of two, non-overlapping, value ranges, so-called windows. As a result, the step size T, which for the CD is about 0.28 µm and for MMCD about 0.15 µm, is known in a simple manner.

In another embodiment a signal component corresponding to one of the lengths of the effects is filtered out and detected, for example, by a run length detector in the discriminating means 9. Such a detector determines the time in which the read signal polarity does not change. A suitable choice for detection is the component corresponding to the shortest run length (thus 3T for CD). The mean value of the shortest run lengths is compared by the discriminating means 9 with the values expected for the different types of information carriers.

In other embodiments there will have to be made a distinction between types of information carriers which differ in other physical parameters. An example of this is the distinction in modulation depth of the read signal between different types of information carriers. For this purpose, the discriminating means may determine the minimum and maximum levels of the read signal 10. The difference is then indicative of the modulation depth.

We claim:

1. A device for reading an information carrier on which an information pattern is recorded in the form of substantially parallel running tracks of readable effects, the device comprising: a read head for generating a read signal by scanning the information carrier at a scanning position, servo tracking means for keeping the scanning position on the track, and discriminating means for determining a type of information carrier, the information pattern having at least one different physical parameter for each type of information carrier, wherein the discriminating means are adapted for determining the type of information carrier on the basis of read-signal properties related to the physical parameter while the servo tracking means are out of operation.

2. The device as claimed in claim 1, wherein to determine the type of information carrier, the discriminating means determine the properties of the frequency spectrum of the read signal when the scanning position is moved in a direction substantially parallel with the tracks.

3. The device as claimed in claim 2, wherein the discriminating means are adapted for determining the type of information carrier, and for each type of information carrier only effects of a limited number of lengths occur and the lengths differ by a fixed step size, by detecting in the read signal at least one frequency component related to one of the lengths and the step size.

4. The device as claimed in claim 2, in which the information carrier is disc-shaped, wherein the movement comprises making the information carrier rotate at a predetermined speed of rotation and positioning the scanning position at a predetermined radial distance from the point of rotation.

5. The device as claimed in claim 1, wherein the discriminating means are adapted for determining the minimum and maximum level of the read signal.

6. The device as claimed in claim 1, wherein the discriminating means are adapted for detecting the number of crossings of the scanning position with a track when the scanning position is moved in a direction transverse to the direction of the tracks.

7. The device as claimed in claim 3, in which the information carrier is disc-shaped, wherein the movement comprises making the information carrier rotate at a predetermined speed of rotation and positioning the scanning position at a predetermined radial distance from the point of rotation.

8. A device for reading information from at least two different types of information carriers on each of which a respective information pattern is recorded, the information pattern having at least one different physical parameter for each type of information carrier, said device comprising:
   read means for producing a read signal by scanning the information pattern at a scanning position,
   servo tracking means for keeping the scanning position on track during a normal read operation of the device, and
   means for determining the type of information carrier in use on the basis of signal properties related to the physical parameter read out from the information carrier while the servo tracking means are out of operation.

9. The device as claimed in claim 8 wherein, in order to determine the type of information carrier, the determining means determine the properties of the frequency spectrum of a signal read out by the read means while the scanning position is moved in a direction parallel to the information tracks on the information carrier.

10. The device as claimed in claim 8 wherein the information pattern is recorded as tracks of readable effects in which, for each type of information carrier effects of a limited number of lengths occur and the lengths differ by a fixed step size, and, in order to determine the type of information carrier, the determining means detect in the read-out signal at least one frequency component related to one of the lengths and the step size.

11. The device as claimed in claim 8 wherein the information carrier is disk-shaped and rotatable about a rotation point, and, in order to determine the type of information carrier, the scanning position is moved in a direction parallel to the information tracks on the information carrier and the information carrier rotates at a given rotation speed and the scanning position is located at a predetermined distance from the rotation point.

12. The device as claimed in claim 8 wherein the determining means include means for determining the minimum and maximum level of the read-out signal.

13. The device as claimed in claim 8 wherein the determining means include means for detecting the crossings of the scanning position with an information track when the scanning position is moved in a direction transverse to the direction of the tracks.

14. The device as claimed in claim 8 further comprising control means responsive to said determining means for energizing the servo tracking means after the type of information carrier has been determined.

15. In a device for reading an information carrier, a method of determining the type of information carrier from among at least two different types of information carriers on which information is recorded in a track pattern that has various physical parameters, the method comprising:

generating a read signal by scanning the information track pattern at a scanning position while a servo tracking member of the device is inoperative, and determining the type of information carrier on the basis of signal properties related to the physical parameters and derived from the read signal.

16. The method as claimed in claim 15 further comprising: energizing the servo tracking member after determination of the type of information carrier.

17. The method as claimed in claim 15 wherein the type of information carrier is determined by deriving properties of the frequency spectrum of the read signal when the scanning position is moved in a direction parallel to the information tracks on the information carrier.

18. The method as claimed in claim 15 wherein the type of information carrier is determined by determining the minimum and maximum level of the read-out signal.

19. The method as claimed in claim 15 wherein the type of information carrier is determined by detecting the crossings of the scanning position with an information track when the scanning position is moved in a direction transverse to the direction of the tracks.

20. The device as claimed in claim 1 further comprising control means responsive to said discriminating means for energizing the servo tracking means after the type of information carrier has been determined.

* * * * *